US009703748B2

United States Patent
Smith et al.

(10) Patent No.: US 9,703,748 B2
(45) Date of Patent: Jul. 11, 2017

(54) METHOD AND APPARATUS OF EMULATING INTERFACES USING FIFOS

(71) Applicant: Apple Inc., Cupertino, CA (US)

(72) Inventors: Michael J. Smith, San Francisco, CA (US); Josh P. de Cesare, Campbell, CA (US); Brijesh Tripathi, Los Altos, CA (US); Derek Iwamoto, San Francisco, CA (US); Shane J Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 14/459,731

(22) Filed: Aug. 14, 2014

(65) Prior Publication Data

US 2015/0356050 A1    Dec. 10, 2015

Related U.S. Application Data

(60) Provisional application No. 62/008,555, filed on Jun. 6, 2014.

(51) Int. Cl.

| G06F 13/36 | (2006.01) |
|---|---|
| G06F 13/42 | (2006.01) |
| G06F 13/40 | (2006.01) |
| G06F 13/10 | (2006.01) |
| G06F 13/38 | (2006.01) |

(52) U.S. Cl.
CPC ........ *G06F 13/4226* (2013.01); *G06F 13/105* (2013.01); *G06F 13/385* (2013.01); *G06F 13/4022* (2013.01); *G06F 13/4059* (2013.01)

(58) Field of Classification Search
USPC ................. 710/104–110, 306–309
See application file for complete search history.

(56) References Cited

U.S. PATENT DOCUMENTS 5,604,870 A    2/1997 Moss et al.
6,272,452 B1 *  8/2001 Wu ........................ G06F 13/385
                                                    703/24

(Continued)

FOREIGN PATENT DOCUMENTS

| CN | 101770817 | 7/2010 |
|---|---|---|
| CN | 103616813 | 3/2014 |

OTHER PUBLICATIONS

Office Action and Search Report in ROC (Taiwan) Pat. Appln. No. 104113571 issued Jun. 8, 2016.

(Continued)

*Primary Examiner* — Raymond Phan
(74) *Attorney, Agent, or Firm* — Meyertons, Hood, Kivlin, Kowert & Goetzel, P.C.; Erik A. Heter

(57) ABSTRACT

An interface emulator for an IC is disclosed. An interface emulator includes a first first-in, first-out memory (FIFO) and a second FIFO. The first FIFO is coupled to receive data from an access port and a second FIFO coupled to receive data from at least one functional unit in the IC. The access port may be coupled to a device that is external to the IC. The external device may write information into the first FIFO, and this information may subsequently be read by a functional unit in the IC. Similarly, the functional unit may write information into the second FIFO, with the external device subsequently reading the information. Information may be written into the FIFOs in accordance with a predefined protocol. Thus, a particular type of interface may be emulated even though the physical connection and supporting circuitry for that interface is not otherwise implemented in the IC.

20 Claims, 4 Drawing Sheets

(56) References Cited

U.S. PATENT DOCUMENTS

| | | | |
|---|---|---|---|
| 7,975,921 | B2 | 7/2011 | Mani et al. |
| 8,769,448 | B1 | 7/2014 | Sundararajan et al. |
| 9,047,257 | B2* | 6/2015 | Aravindhan ......... H01R 31/005 |
| 2004/0068590 | A1 | 4/2004 | Nishino |
| 2006/0149863 | A1* | 7/2006 | Engler ................ G06F 13/4045 710/46 |
| 2011/0060850 | A1* | 3/2011 | Ko ........................ H04W 88/06 710/15 |
| 2013/0035925 | A1 | 2/2013 | Chang et al. |
| 2013/0108065 | A1* | 5/2013 | Mullins ............ G01R 31/31701 381/58 |

OTHER PUBLICATIONS

Holger Wild, "ARM On-Chip Debug Interfaces—Chances and Limitations," iSYSTEM; Feb. 26, 2009, http://www.isystem.com/files/downloads/Articles/isystem_arm-on-chip-debug-interfaces.pdf.

"Future Technology Devices International Ltd. FT245R USB FIFO IC Datasheet Version 2.13", Jan. 1, 2010, pp. 1-40, XP055190699, Retrieved from the Internet: URL: http://www.ftdichip.com/Support/Documents/DataSheets/ICs/DS_FT245R.pdf [retrieved on May 21, 2015].

Written Opinion, International Application No. PCT/US2015/024653, mailed Jun. 9, 2015, 8 pages.

Search Report, International Application No. PCT/US2015/024653, mailed Jun. 9, 2015, 5 pages.

International Search Report in application No. PCT/US2015/024653 issued Dec. 15, 2016.

"Future Technology Devices International Ltd, FT245R USB FIFO IC Datasheet Version 2.13", Jan. 1, 2010 (Jan. 1, 2010), pp. 1-40, XP055190699, http://ftdichip.com/Support/Documents/DataSheets/ICs/DS_FT245R.pdf.

\* cited by examiner

METHOD AND APPARATUS OF EMULATING INTERFACES USING FIFOS

PRIORITY INFORMATION

This application claims priority to U.S. provisional patent application Ser. No. 62/008,555, entitled "Interface Emulator using FIFOs", filed Jun. 6, 2014, and which is hereby incorporated by reference in its entirety as though fully and completely set forth herein.

BACKGROUND

Technical Field

This disclosure is directed to integrated circuits, and more particularly, to interfaces for providing access to an integrated circuit.

Description of the Related Art

Modern integrated circuits (ICs) have incorporated a significant amount of functionality compared to their predecessors. In particular, system-on-a-chip (SoC) ICs may incorporate onto a single IC die a number of functions, including that of general purpose processor cores, graphics processing units, various types of memories, and different interface units.

The different interface units may be used to extend the functionality of the device in which the SoC is implemented. For example, a universal serial bus (USB) interface unit may be implemented on an SoC, with the appropriate pins to enable connection of a USB device. Various USB peripherals may then be attached to the device in which the SoC is implemented. Similarly, an interface for a universal asynchronous receiver-transmitter (UART), with appropriate pins, may be implemented on an SoC. In general, circuitry and pins for a number of different interfaces may be implemented on an SoC (or IC in general) to the degree that such implementation if feasible.

SUMMARY

An interface emulator for an IC is disclosed. In one embodiment, an interface emulator includes a first first-in, first-out memory (FIFO) and a second FIFO. The first FIFO is coupled to receive data from an access port and a second FIFO coupled to receive data from at least one functional unit in the IC. The access port may be coupled to a device that is external to the device in which the IC is implemented. The external device may write information into the first FIFO, and this information may subsequently be read by a functional unit in the IC. Similarly, the functional unit may write information into the second FIFO, with the external device subsequently reading the information. Information may be written into the FIFOs in accordance with a predefined protocol. Thus, a particular type of interface may be emulated even though the physical connection and supporting circuitry for that interface is not otherwise implemented in the IC. Embodiments are also possible and contemplated wherein an interface emulator is implemented using a single FIFO for supporting unidirectional communications.

In one embodiment, an IC may include a number of interface emulators, For example, a first interface emulator may emulate a universal serial bus (USB) interface, a second interface emulator may emulate a universal asynchronous receiver-transmitter (UART) interface, a third interface emulator may emulate a peripheral component interconnect extended (PCIx) interface, and so on. Each of the interface emulators may utilize the same access port. Thus, for an interface emulator emulating a USB port, data may be written into corresponding FIFOs as packets in accordance with the USB protocol. Similarly, when emulating a UART interface, data may be written into corresponding FIFOs as frames in accordance with the UART protocol. In general, data may be written into corresponding FIFOs in whatever manner that corresponds with the interface being emulated.

In on embodiment, the access port may be a single wire debug (SWD) access port, although numerous other types are possible and contemplated. Each interface emulator may also include a pair of FIFOs, one for inputting data into the IC, the other for outputting data from the IC. In various embodiments, timers may be implemented to enforce latency requirements for the various FIFOs, and thus for the interface emulators as a whole. A timer may begin monitoring responsiveness of data read from a FIFO. Each time new data is read from the FIFO, the timer may be reset. If the timer reaches a predefined time limit, one or more entries in a corresponding FIFO may be cleared. In some embodiments, only a single entry is cleared, while in other embodiments, multiple entries are cleared. In some embodiments, the entire FIFO may be cleared if the timer indicates that the predefined time limit has elapsed. By clearing data that has been residing in a FIFO for a predetermined time limit, forward progress may continue and maximum latency limits may be enforced.

BRIEF DESCRIPTION OF THE DRAWINGS

The following detailed description makes reference to the accompanying drawings, which are now briefly described.

Figure 1:
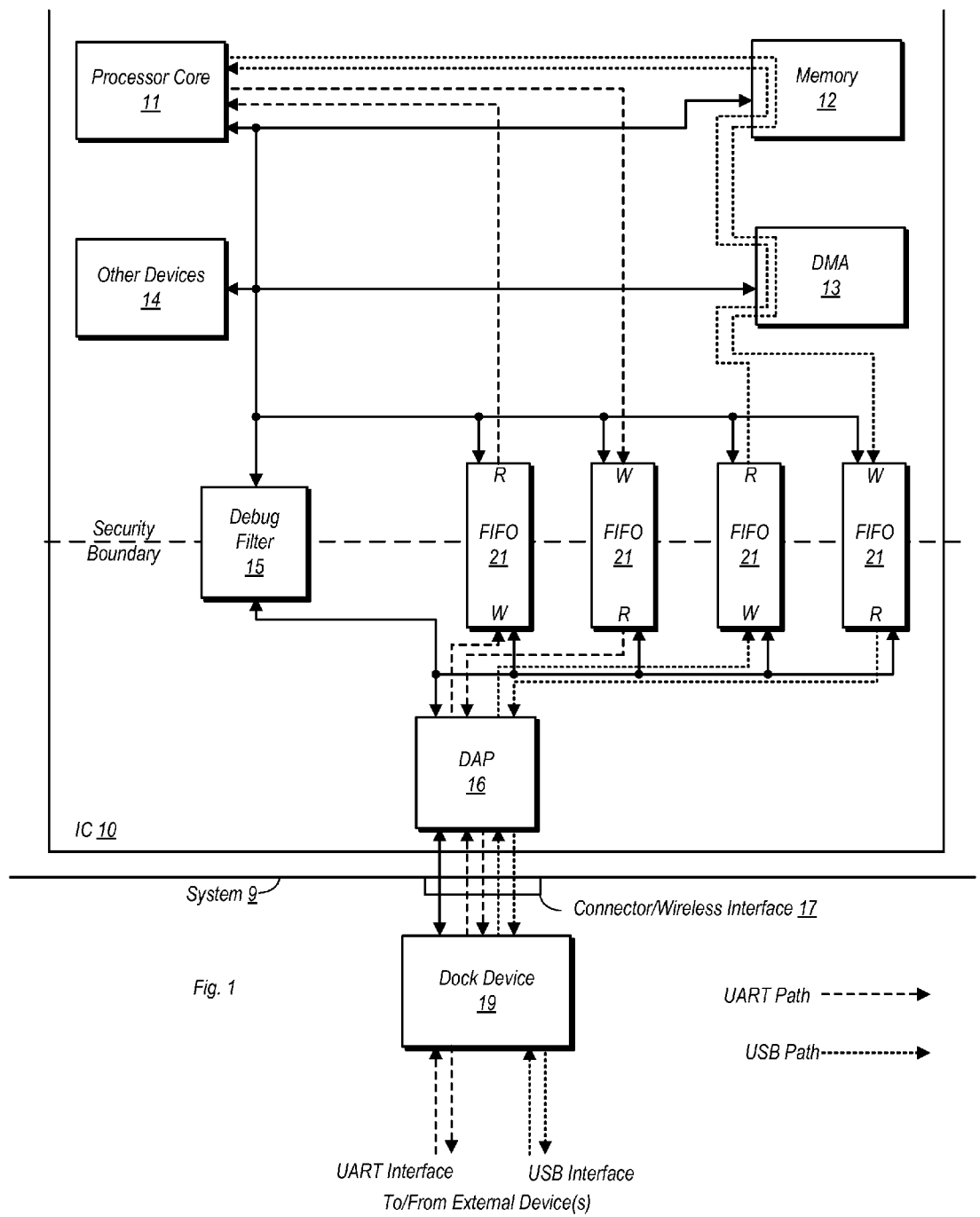
FIG. 1 is a block diagram of one embodiment of an IC including interface emulators.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION OF EMBODIMENTS

Turning now to FIG. 1, a block diagram of one embodiment of an IC including interface emulators is shown. In the embodiment shown, IC 10 is a part of system 9. Examples of system 9 include (but are not limited to) computer systems, table computers, mobile phones (including smartphones), and so forth. System 9 in the embodiment shown includes IC 10 and a connector/wireless interface 17, which may enable an external device (e.g., a device coupled to dock device 19, in this example) to connect to IC 10 through a hardwired or wireless connection.

IC 10 in the embodiment shown is a system-on-a-chip (SoC) that includes at least one processor core 11, a memory 12 (e.g., a random access memory, or RAM), a direct memory access controller (DMA) 13, and other devices 14. The other devices 14 may include (but are not limited to) graphics processors, various bus interface units for interfacing to other buses internal to system 9, internal bus bridges, bulk storage and related controllers, and so on.

IC 10 in the embodiment shown includes a debug access port (DAP) 16. The DAP 16 may be used to obtain access to the various functional units of IC 10, via debug filter 15, for performing debugging operations. In one embodiment, DAP 16 may support the JTAG (Joint Test Action Group) protocol, and thus connector/wireless interface 17 may also be configured to support a JTAG interface. Connector/wireless interface 17, and thus DAP 16, may further support a serial wire debug (SWD) interface, which is an electrical alternative to prior JTAG interfaces that nevertheless utilizes the JTAG protocol. By obtaining access to various internal functional units of IC 10 through DAP 16, debugging may be performed on the hardware design of IC 10 or of software executing on IC 10.

DAP 16 in the embodiment shown is also coupled to four instances of FIFO 21. The FIFOs 21 in the embodiment shown may be used to implement emulators that may each emulate an interface of a specific type even though pins/connections are not otherwise provided for the emulated interface. In this particular example, a universal serial bus (USB) interface and a universal asynchronous receiver-transmitter (UART) interface may be emulated using FIFOs 21. Other types of interfaces that may be emulated include Bluetooth and PCIx interfaces. It is noted that the interface types mentioned here are exemplary, and further, that a wide variety of interface types not explicitly discussed herein may be emulated in a similar manner.

For emulating a given interface, a pair of FIFO's 21 is provided. A first FIFO 21 used in emulating an interface may be an input FIFO used for inputting data into a functional unit of IC 10. Data may be written into an input FIFO 21 from a device external to IC 10 via DAP 16. A functional unit within IC 10 may then read the data from the input FIFO 21. A second FIFO 21 used in emulating an interface may be an output FIFO used for outputting data to a device external to IC 10. Data may be written into an output FIFO 21 from a functional unit of IC 10. The external device may then read the data from the output FIFO 21 via DAP 16 and connector/wireless interface 17.

In the embodiment shown, the FIFOs 21 straddle a security boundary. Security may be enforced by the functional units internal to IC 10, such as those shown here, as well as by software executing on IC 10. In particular, the functional units or software executing on IC 10 may determine whether to write data to an output FIFO responsive to a query received from an input FIFO. In this manner, critical/secure data may be protected while otherwise allowing bi-directional communications with an external device through the FIFOs 21.

FIFOs 21 may support various types of communications. More particularly, the FIFOs 21 may allow for the writing of a number of smaller messages to be written atomically, and may also be able to support the writing of larger messages depending on the availability of space. Support for atomic messages may depend on hardware capabilities of IC 10. For example, if a FIFO 21 is coupled to a 32-bit bus, then atomic messages of one, two, three, or four bytes may be supported. Furthermore, the size of and currently available space in a FIFO 21 may factor in determining the size of a larger message than may be written therein. Using the UART example shown in FIG. 1, commands, status queries, and other messages of smaller size may be conveyed between processor core 11 and an external device coupled to the UART interface of dock device 19 via the correspondingly coupled FIFOs 21. Similarly, using the USB example shown in FIG. 1, USB packets (e.g., 64 byte packets) may be transferred through the FIFOs 21 provided to support the emulation of that particular interface.

In the embodiment shown, the FIFOs 21 that support emulation of a UART interface are coupled directly to processor core 11. Accordingly, processor 11 can read messages directly from a first FIFO 21 (an input FIFO) and write messages directly to a second FIFO 21 (an output FIFO). The FIFOs 21 supporting emulation of a USB interface in this embodiment are directly coupled to DMA 13. Thus, DMA 13 may read USB packets from the correspondingly coupled input FIFO and may write USB packets directly to the correspondingly coupled output FIFO. Packets read from an input FIFO by DMA 13 may be stored in memory 12 and subsequently read by processor core 11. Similarly, processor core 11 may write information into memory 12 in a USB packet format, with DMA 13 subsequently accessing the information and writing it to the correspondingly coupled output FIFO.

While the embodiments discussed above are configured to support bi-directional communications, embodiments utilizing only a single FIFO and configured to support unidirectional communications are also possible and contemplated. In a single FIFO embodiment, a FIFO may be used to input data into IC 10 or to output data from IC 10. Various protocols may be supported, including those discussed above. For example, if it is desired to only read data from IC 10 using the UART protocol, an embodiment could be implemented that does not include the input FIFO for the UART interface emulator, but does include the output FIFO. Data could be written to the output FIFO 21 from a functional unit, while being read from the output FIFO by an external device via DAP 16. In general, interface emulators may be implemented to support bi-directional or unidirectional communications as desired.

Figure 2:
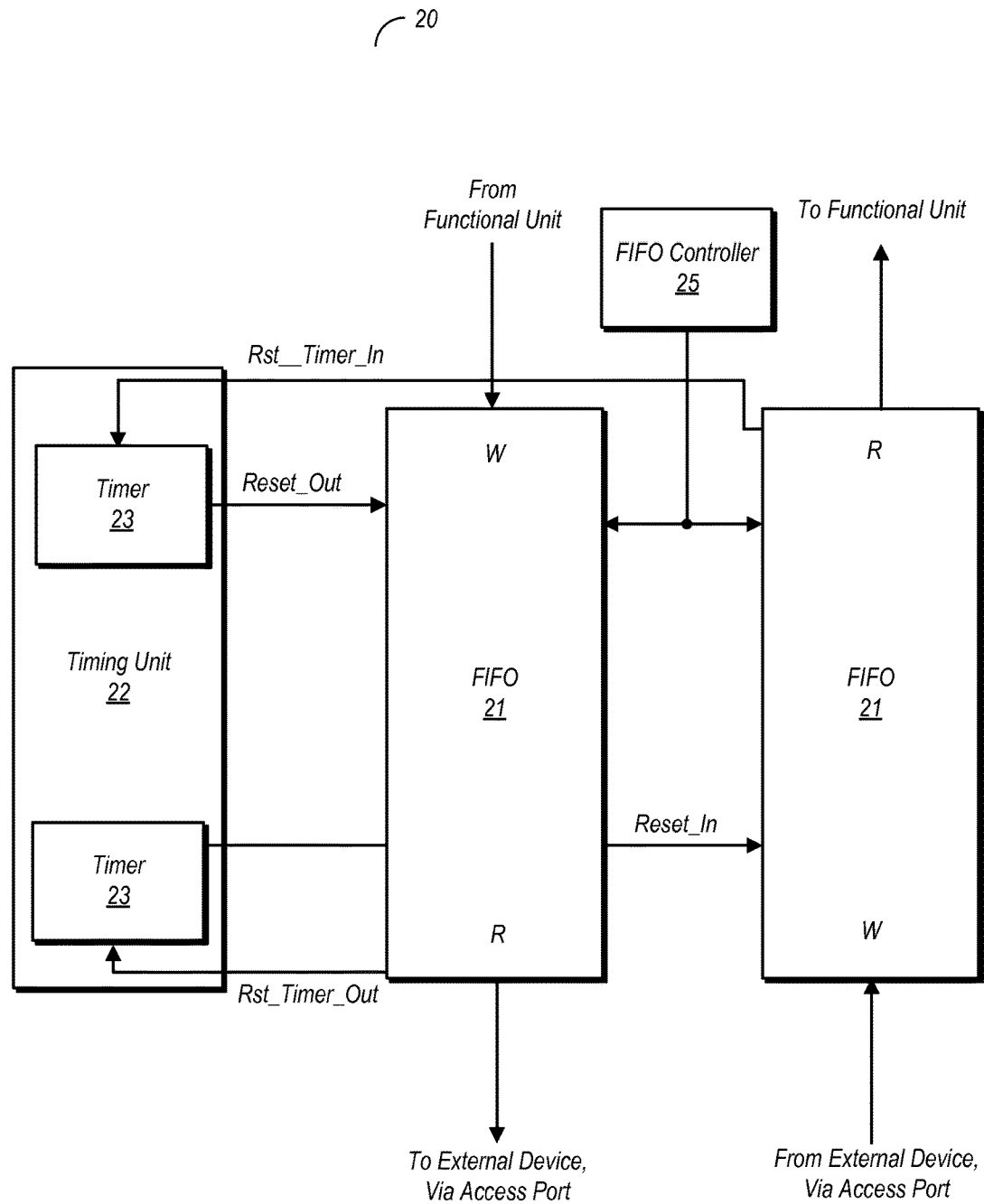
FIG. 2 is a block diagram further illustrating an exemplary embodiment of an interface emulator.

In emulating an interface, it is sometimes necessary to enforce latency requirements. FIG. 2 further illustrates one embodiment of an interface emulator in which latency requirements may be enforced. In the embodiment shown, interface emulator 20 includes two FIFOs 21, one of which serves as an input FIFO while the other serves as an output FIFO. Interface emulator 20 also includes a timing unit 22 having first and second timers 23. Each of the timers 23 is coupled to a corresponding one of the FIFOs 21. When data is read from a FIFO 21, a timer reset signal (e.g., Rst_Timer_Out) may be asserted to the correspondingly coupled timer 23. Responsive to assertion of the timer reset signal, the timer 23 may be reset to zero and may begin tracking the time. If the time reaches a predetermined threshold value, the timer may assert a FIFO reset signal (e.g., Reset_Out), which may cause one or more entries in the correspondingly coupled FIFO's 21 to be cleared. In some embodiments, one or more of the oldest entries in a FIFO 21 may be erased. In another embodiment, the entire contents of a FIFO 21 may be erased responsive to assertion of the corresponding FIFO reset signal. The predetermined time threshold may be set in accordance with maximum latency requirements for the interface that is being emulated. If data in a FIFO 21 is not read within the maximum latency window as set by the predetermined threshold, the data may be cleared from the relevant storage locations when the FIFO reset signal is asserted. In this manner, forward progress by the write client is not inhibited by the failure to read data by a read client coupled to the FIFO 21, and a maximum latency is enforced. The write client may continue to write data into the corresponding FIFO 21 irrespective of whether the read client is actually reading the data. Moreover, this illustrates another aspect of various embodiments of interface emulator 20, namely that the clients do not have to be explicitly aware of one another's existence.

Interface emulator in the embodiment shown further includes a FIFO controller 25. The FIFO controller 25 may perform various functions, including control of the positions of the read and write pointers for each FIFO 21. Although not explicitly shown, FIFO controller 25 may also include registers that store information regarding operation of the FIFOs. For example, registers may be provided to indicate how much data is stored in each FIFO 21 at a given moment. The contents of these registers may be updated as data is written to and read from a corresponding FIFO 21.

In general, the interface emulators discussed herein may allow the exchange of data, commands, and so forth between an IC and an external device even if the IC does not otherwise include the pins to support such an interface. Alternatively, an interface emulator as described herein may be used to implement an extra instance of an interface when the pins are not otherwise provided to support that instance. The main operation may be reduced to reads of a FIFO 21 and writes to a FIFO 21. Since FIFOs 21 are provided for both input and output paths, bi-directional communications may be supported. From a hardware perspective, the only additional circuitry used to emulate an interface are the FIFOs 21 and supporting circuitry such as that discussed in reference to FIG. 2. Thus, the operation of an emulated interface may be broken down into reads and writes of the FIFOs 21, with other parts of the interface protocol supported by circuitry within IC 10 and/or software that executes on IC 10. Accordingly, interfaces that can support reads and writes can be emulated with only a small amount of additional circuitry and without adding extra pins to the pin count of the IC. This may also allow a number of different emulated interfaces to share the same access port (e.g., DAP 16 as shown in FIG. 1).

Figure 3:
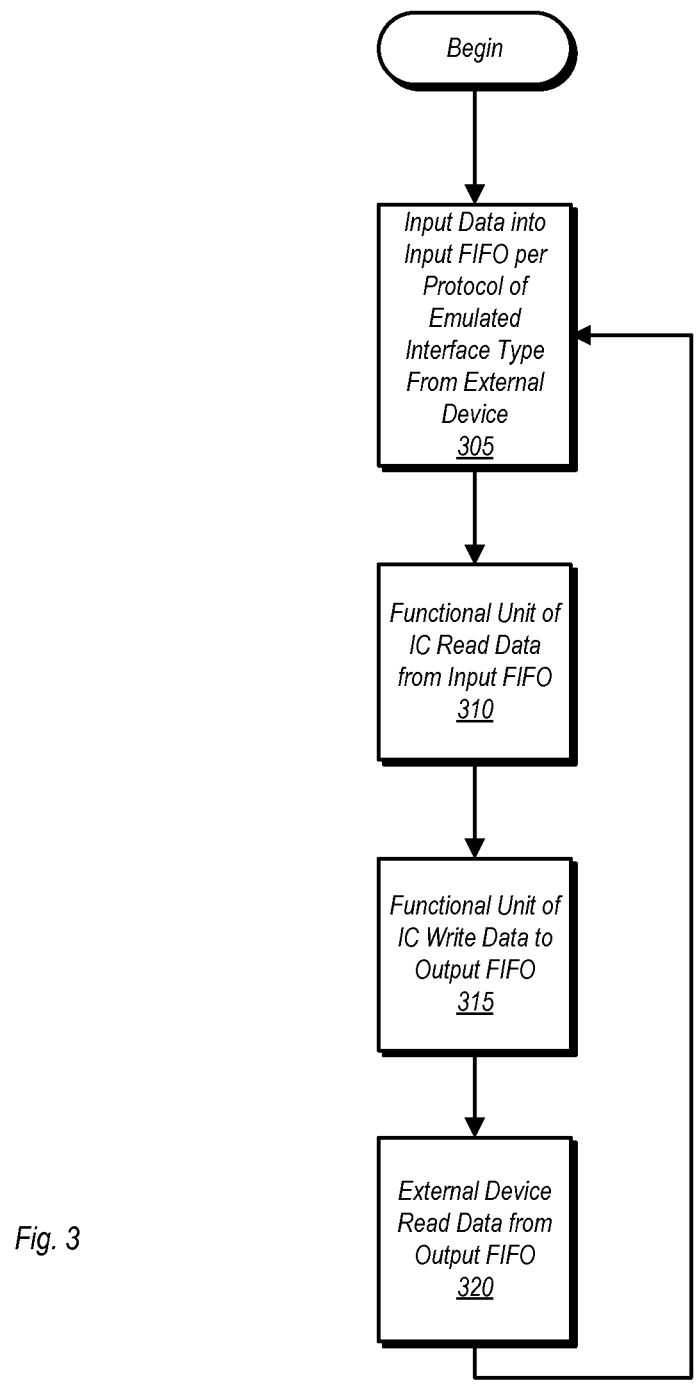
FIG. 3 is a flow diagram illustrating one embodiment of a method for conducting communications between a functional unit in an IC and a device external thereto.

FIG. 3 is a flow diagram illustrating one embodiment of a method for conducting communications between a functional unit in an IC and a device external thereto. Method 300 may be performed using various embodiments of the circuitry discussed above as well as with software that executes on that circuitry. Furthermore, embodiments of hardware/circuitry and corresponding software not explicitly discussed herein may also be used to perform method 300.

It is further noted that the operation described by method 300 is exemplary, and is not intended to illustrate the full set of capabilities of various embodiments of an interface emulator as discussed herein. On the contrary, method 300 is presented herein in order to illustrate the basic operation of an interface emulator, although it is to be understood that other operations not discussed herein may also be performed and may thus fall within the scope of this disclosure.

Method 300 begins with the inputting of data into an input FIFO from an external device and per the protocol of an emulated interface (block 305). For example, if the emulated interface is a USB interface, then one or more packets may be written into the input FIFO from the external device.

Subsequent to writing the data into the input FIFO, a functional unit in the IC may read the data (block 310). Using the USB example shown in FIG. 1, the data may be read from the input FIFO by a DMA controller. The particular functional unit within an IC that reads the data may vary from one interface type to the next. It is also noted that in some cases, the functional unit may not read data that has been written into the input FIFO. In such instances, the data may eventually be cleared from the FIFO if it is not read within a maximum specified latency.

The functional unit reading the data may respond thereto by writing data to an output FIFO (block 315). Thereafter, the external device may read the data from the output FIFO (block 320). The method may return to block 305 at this point if the external device has more data to input into the IC.

Figure 4:
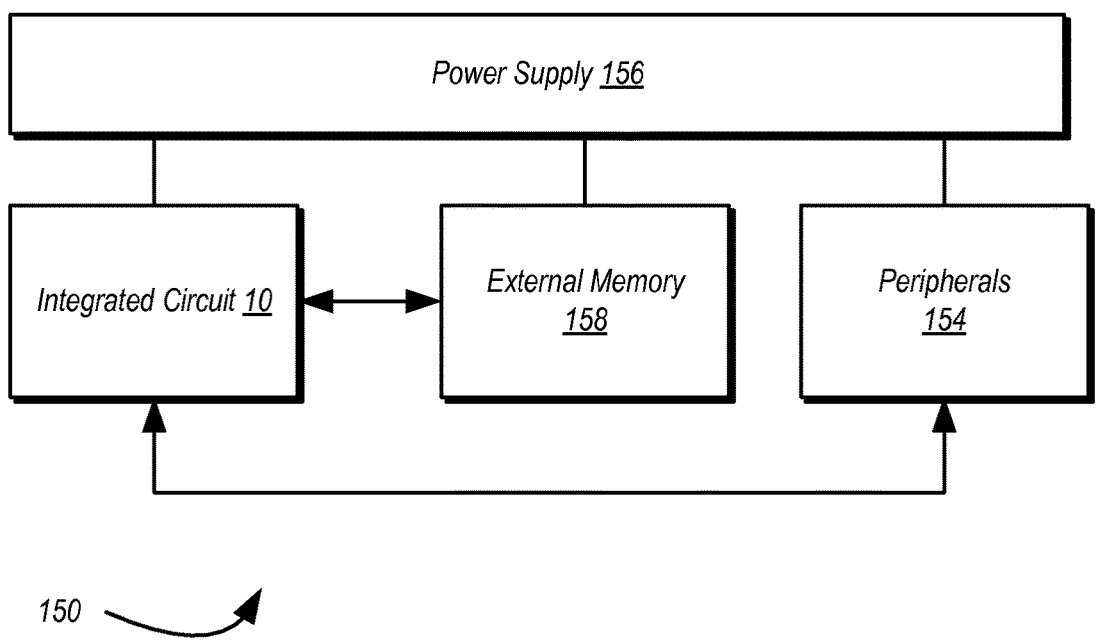
FIG. 4 is a block diagram of one embodiment of an exemplary system.

Turning next to FIG. 4, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   an access port configured to couple the integrated circuit to an external device;
   a first first-in, first-out memory (FIFO) coupled to receive data from the external device via the access port and further coupled to provide data to a functional unit of the integrated circuit; and
   a second FIFO coupled to provide data to the external device via the access port and further coupled to receive data from the functional unit of the integrated circuit;
   wherein the access port, the first FIFO, and the second FIFO comprise a communications channel configured to emulate an interface having a predefined protocol, wherein the functional unit is configured to conduct communications with the external device through the communications channel via reads from the first FIFO and writes to the second FIFO.

2. The integrated circuit as recited in claim 1, wherein the access port is a physical access port configured to provide a hardwired connection to the external device.

3. The integrated circuit as recited in claim 1, wherein the access port is configured to provide a wireless connection to the external device.

4. The integrated circuit as recited in claim 1, wherein the communications channel is configured to emulate a universal serial bus (USB) port.

5. The integrated circuit as recited in claim 1, wherein the communications channel is configured to emulated a universal asynchronous receiver transmitter (UART) interface.

6. The integrated circuit as recited in claim 1, wherein the access port is a debug access port configured to provide a JTAG (Joint Test Action Group) interface to the integrated circuit.

7. The integrated circuit as recited in claim 6, wherein the access port is a serial wire debug (SWD) interface.

8. The integrated circuit as recited in claim 1, further comprising a first timer associated with the first FIFO and a second timer associated with the second FIFO, wherein the first and second timers are configured to enforce a maximum latency for the first and second FIFOs, respectively.

9. A method comprising:
   conducting communications between a functional unit internal to an integrated circuit (IC) and an external device coupled to a debug access port, wherein communications are conducted through an interface emulator coupled between the debug access port and the functional unit, the interface emulator implementing a communications channel that emulates an interface having a predefined protocol, wherein conducting communications comprises:
   inputting data to the functional unit from the external device via a first first-in first-out memory (FIFO) in the IC; and
   outputting data from the functional unit to the external device via a second FIFO in the IC.

10. The method as recited in claim 9, wherein the external device is coupled to the IC by a hardwired connection.

11. The method as recited in claim 9, wherein the external device is coupled to the IC by a wireless connection.

12. The method as recited in claim 9, further comprising first and second timers enforcing latency limits for the first and second FIFOs, respectively.

13. The method as recited in claim 9, wherein emulating an interface having a predefined protocol comprises emulating a universal serial bus (USB) interface.

14. The method as recited in claim 9, emulating an interface having a predefined protocol comprises emulating a universal asynchronous receiver transmitter (UART) interface.

15. An integrated circuit comprising:
    a plurality of functional units;
    a debug access port;
    a first interface emulator coupled between the debug access port and at least one of the plurality of functional units, wherein the first interface emulator is configured to emulate an interface having a first predefined protocol, wherein the first interface emulator includes:
    a first first-in, first-out memory (FIFO), wherein the one of the plurality of functional units is configured to conduct communications with an external device coupled to the debug access port via reads from and writes to the FIFO.

16. The integrated circuit as recited in claim 15, wherein the first interface emulator includes a first pair of FIFOs including the first FIFO and a second FIFO, wherein the first FIFO is configured to act as a first input FIFO and wherein the second FIFO is configured to act as a first output FIFO, wherein the first input FIFO is configured to receive data from the external device via the debug access port, and wherein the first output FIFO is configured to provide data to the external device via the debug access port.

17. The integrated circuit as recited in claim 15, further comprising a second interface emulator coupled between the debug access port and one or more of the plurality of functional units, wherein the second interface emulator is configured to emulate an interface having a second predefined protocol and includes a second input FIFO and a second output FIFO.

18. The integrated circuit as recited in claim 15, wherein the debug access port is a serial wire debug port.

19. The integrated circuit as recited in claim 16, further comprising a timing unit coupled to the first input FIFO and the first output FIFO, wherein the timing unit is configured to limit an amount of time that data is stored in the first input FIFO and the first output FIFO.

20. The integrated circuit as recited in claim 17, wherein the first interface emulator is configured to emulate a universal serial bus (USB) interface and the second interface emulator is configured to emulate a universal asynchronous receiver transmitter (UART) interface.

* * * * *

UNITED STATES PATENT AND TRADEMARK OFFICE
CERTIFICATE OF CORRECTION

| | | |
|---|---|---|
| PATENT NO. | : 9,703,748 B2 | |
| APPLICATION NO. | : 14/459731 | |
| DATED | : July 11, 2017 | |
| INVENTOR(S) | : Michael J. Smith et al. | |

It is certified that error appears in the above-identified patent and that said Letters Patent is hereby corrected as shown below:

In the Claims

Column 7, Claim 5, Line 42, please delete "configured to emulated" and substitute --configured to emulate--.

Signed and Sealed this
Third Day of October, 2017

Joseph Matal
*Performing the Functions and Duties of the*
*Under Secretary of Commerce for Intellectual Property and*
*Director of the United States Patent and Trademark Office*